Nov. 22, 1966 F. SEMERIA 3,287,701
TRANSISTORIZED ELECTRONIC DECODER RESPONSIVE TO PLURAL FREQUENCIES
Filed Feb. 27, 1962
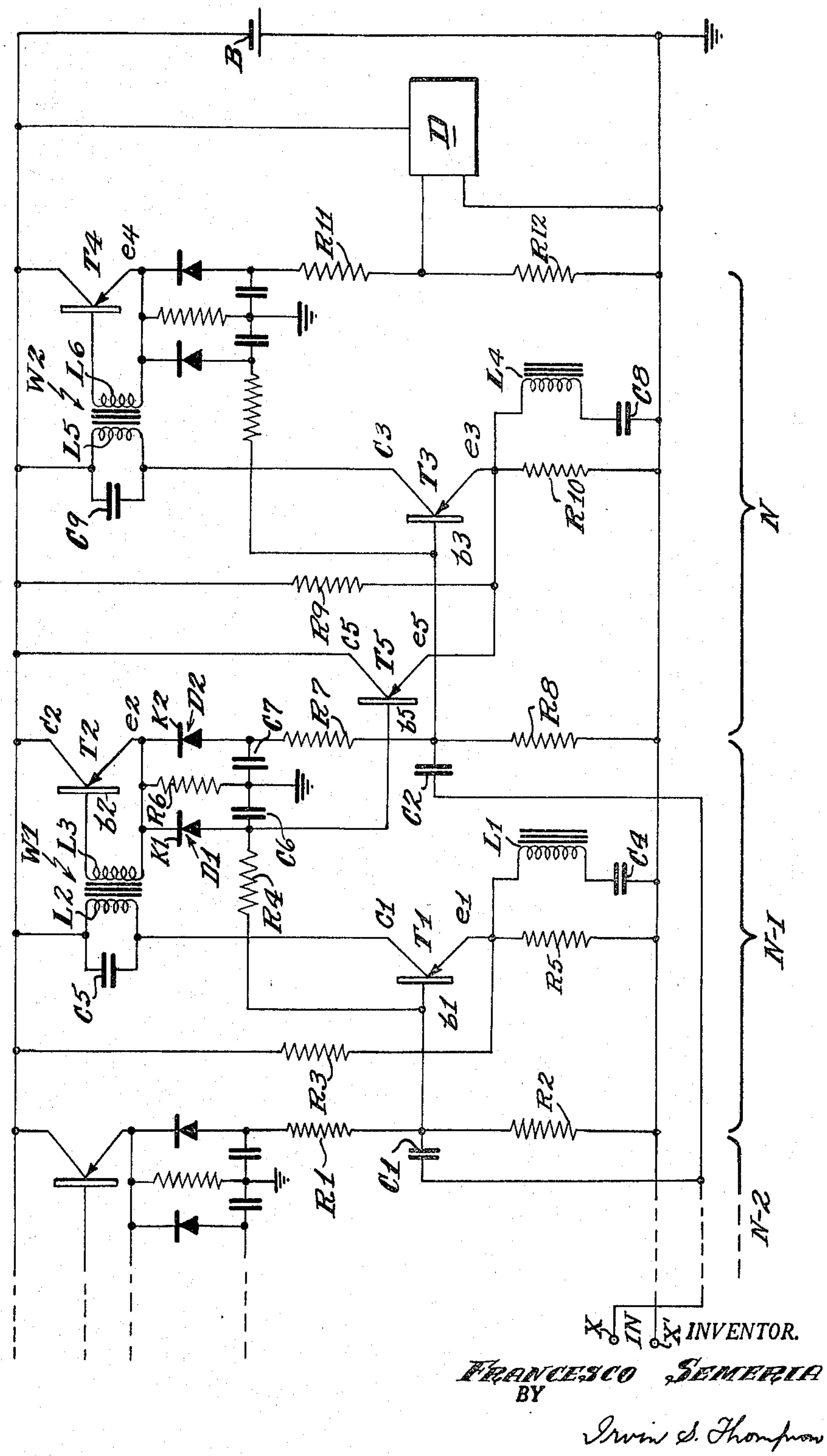
INVENTOR.
FRANCESCO SEMERIA
BY
Irvin S. Thompson
ATTORNEY United States Patent Office 3,287,701
Patented Nov. 22, 1966

3,287,701

TRANSISTORIZED ELECTRONIC DECODER RESPONSIVE TO PLURAL FREQUENCIES

Francesco Semeria, Milan, Italy, assignor to Società Italiana Telecomunicazioni Siemens S.p.A.

Filed Feb. 27, 1962, Ser. No. 176,142
Claims priority, application Italy, June 30, 1961, Patent 14,333
3 Claims. (Cl. 340—171)

The present invention relates to an improved multistage transistor device for electronic decoding of a sequence or series of signals of different frequencies. With this invention, the sequence being decoded may have any selected frequency eventually repeated therein, provided that immediately consecutive signals are not of the same frequency. The signal sequence may, for example, be in the form of a train of pulses of different frequencies, or the individual signals may be of any other suitable type.

Decoding devices are already known which consist of a series of frequency selective electronic receivers orderly assigned to pulses of a sequence to be decoded, each receiver being operative only at the frequency of its respective assigned pulse. The first receiver of such a decoder is adapted to always be ready to receive signals, while the remaining receivers initially are not only properly biased but also blocked or maintained in their resting condition. Every successive pulse of the sequence, if it is a correctly coded sequence, actuates the corresponding receiver operating at the frequency of the pulse, such receiver having been made ready to receive by the preceding pulse of the sequence. This corresponding receiver, when actuated by its pulse, prearranges the next receiver in the decoder to receive by unblocking the latter electronically during a suitable time interval. Every receiver, excluding the first one, is arranged to remain automatically effective, that is unblocked, during the entire duration of it respective pulse or signal. In such decoders, each receiver usually consists of a frequency selective transistor amplifier driving an electronic switch which is opened in the resting condition of the receiver.

The operation of the type of decoder just mentioned does not give rise to any decoding error provided that no extraneous frequency signals are added to or superimposed upon the pulse sequence received, where such extraneous frequency corresponds to one of the frequencies by which the decoder itself is characterized.

Unfortunately, however, one of the most frequent disturbances that may take place in the operation of these decoders consists in the presence, at their inputs, of a mixture of rapidly varying frequencies. Where the connection between coder and decoder is by means of a radio link, these disturbances are due to cross-talk from or interference with other transmitters, and will will cause decoding errors to occur.

Consider, for instance, the last two stages of a decoder in which the penultimate stage functions at a frequency F1 and the last stage at a frequency F2. It is entirely possible for a mixture of disturbing frequencies including the frequency F2 to appear at the decoder input during reception of the pulse of frequency F1. If that happens, the last stage, which has already been unblocked by the action of its preceding stage, will immediately amplify the disturbing frequency F2 and actuate the device for signalling the detection of the received sequence, before the last pulse F2 of the sequence has arrived. Thus, under such conditions the decoding is clearly erroneous.

Sometimes the aforementioned signalling device may be actuated even when no sequence of pulses has been received. This will happen whenever a disturbance, made up of a mixture of time varying frequencies, at some instant includes all of the frequencies that characterize the decoder. The occurrence of such an event causes a practically simultaneous actuation of all of the decoder stages, and consequently the erroneous actuation of the signalling device.

An object of the present invention is to provide an improved multi-stage electronic decoder.

Another object is to eliminate decoding errors due to disturbed reception of a coded signal sequence in a multi-stage transistor decoder.

A further object of this invention is to prevent erroneous actuation of the device signalling the detection of the received sequence in a multi-stage transistor decoder when disturbing frequency signals are applied to its input.

An additional object is to provide a transistor decoder of improved form which is of simple and economical construction, completely reliable and error-free in its operation, and adapted for wide practical application.

Briefly summarizing the present invention, every decoder stage includes at least a first and a second transistor. The first transistor serves as a frequency selective amplifier which, when actuated, has the function of driving the second transistor of the same stage. The second transistor amplifies and rectifies a received signal of proper frequency. The rectified signal is used to charge two condensers, one of which has its ungrounded terminal connected through a resistor to the base of the first transistor. The second transistor acts as an electronic switch.

Between first and second consecutive decoder stages, an additional transistor is inserted in the following manner. Its base electrode is directly connected to the ungrounded plate of the one condenser coupled to the base of the first transistor of the first stage; the collector of this additional transistor is connected to the bias voltage source of the decoder; while its emitter is directly connected to the emitter of the first transistor of the second stage, which, in turn, is connected to ground through a series feedback resistor. The function of the additional transistor is to cut-off or inhibit the first transistor of the second stage by means of a D.-C. signal of proper polarity generated under appropriate conditions by the first stage. This short digest is, of course, not a complete description, it being understood that the invention includes in its scope, all of the features recited in the appended claims.

Various other objects and advantages will appear from the following description of one embodiment of the invention, while the novel features will be particularly pointed out hereinafter in the appended claims.

In the embodiment of the invention illustrated in the single figure of the accompanying drawing, *N*–1 and N refer to the last two stages of the decoder circuit, while D is a device serving to signal the detection of a proper received sequence.

In the penultimate stage *N*–1, a voltage divider consisting of resistors R1 and R2 is connected, at one end of resistor R1, to the D.-C. output of the preceding stage *N*–2. The mid-point of this voltage divider is connected both to a coupling condenser C1 and to base *b*1 of a first transistor T1. Another voltage divider formed by a pair of resistors R3 and R5 is connected between the bias voltage source B and circuit ground. The junction of R3 and R5 is coupled directly to the emitter *e*1 of transistor T1. A series resonant circuit comprising a ferrite cored coil L1 and a condenser C4 is in parallel with resistor R5 between emitter *e*1 and ground. A parallel resonant circuit including condenser C5 in parallel with the primary winding L2 of a transformer W1 couples the collector *c*1 of transistor T1 to voltage source B. Both resonant circuits L1–C4 and L2–C5 are arranged to operate at the same resonant frequency $f1$.

The secondary winding L3 of transformer W1 serves to join base $b2$ and emitter $e2$ of a second transistor T2 of the stage $N-1$. The bias voltage of source B is applied to the collector $c2$ of transistor T2. A resistor R6 connects emitter $e2$ to ground, while a pair of similar diode-condenser networks are arranged in parallel with resistor R6. The first such network contains a decoupling diode D1 in series with a condenser C6, the cathode $k1$ of diode D1 being connected to emitter $e2$. The remaining network has a condenser C7 in series with a diode D2, which is poled in the same direction as diode D1. Both condensers C6 and C7 have one plate thereof grounded. In this arrangement, the decoupling diodes permit the charging of condensers C6 and C7 from emitter $e2$ when transistor T2 conducts, as will be described later; however, these diodes subsequently prevent the condensers from discharging through resistor R6, which normally has a relatively small resistance.

The junction between diode D1 and condenser C6 is connected through a suitable resistor R4 to base $b1$ of the first transistor T1. Two resistors R7 and R8 in series are connected between the ungrounded plate of condenser C7 and circuit ground. A connection from the midpoint of voltage divider R7–R8 to the base $b3$ of the first transistor of stage N serves to apply the D.-C. output signal of stage $N-1$ to the last stage of the decoder.

The last stage N is substantially identical with the preceding stage $N-1$, except that its resonant circuits L4–C8 and L5–C9 are both tuned to another frequency $f2$ which is different from $f1$. Also, the junction of resistors R11 and R12 is connected directly to one terminal of signalling device D, the other input terminal of the latter being grounded.

The pulse train or sequence to be decoded is impressed as an input upon all of the decoder stages at once in parallel from the main input terminals X–X′ through coupling condensers such as C1 and C2.

In accordance with this invention, an additional transistor T5 acting as a blocking or inhibiting transistor is inserted between stage N and the penultimate stage $N-1$. This transistor T5 has an emitter $e5$ connected directly to the common point between resistor R9, coil L4, series feedback resistor R10 and the emitter $e3$ of transistor T3 in stage N; its collector $c5$ being coupled to the negative terminal of bias source B. The base $b5$ of transistor T5 is connected to the junction of condenser C6, diode D1, and resistor R4 of stage $N-1$. The time constant of the circuit C6–R4–R2 which drives the base $b5$ of the additional transistor is made very much shorter than the time constant of the circuit C7–R7–R8.

The operation of the improved decoder of this invention will now be described. The sequence to be decoded, containing N separate pulses or signals, is applied in any suitable manner to input terminals X–X′ of the transistor decoder. The pulse number $N-1$ is of frequency $f1$, if the sequence is correct, and is therefore amplified and rectified by stage $N-1$. The tuned amplifier formed by transistor T1 responds to this frequency, but the first transistors in adjacent stages $N-2$ and N do not. Pulse $N-1$, after amplification, is coupled by transformer W1 to transistor T2, applying to emitter $e2$ a negative voltage which charges both condensers C6 and C7 through decoupling diodes D1 and D2, respectively. When condenser C6 is fully charged to the negative potential of $e2$, it discharges through resistors R4 and R2 to impress a holding bias on base $b1$, which maintains conduction in transistor T1. Simultaneously, condenser C7 is discharging through resistors R7 and R8, thereby impressing a negative holding bias upon base $b3$ of transistor T3 which will tend to unblock the following stage N. However, the action of transistor T5 prevents any such unblocking of transistor T3, until the instant that pulse $N-1$ terminates.

Transistor T5 blocks stage N in the following manner. While condenser C6 discharges through R4–R2, it also discharges through the base-emitter circuit of the transistor T5 and drives the latter into conduction. This conduction serves to reduce the potential difference between emitter $e3$ and collector $c3$ of the transistor T3 nearly to zero. Therefore, since emitter $e3$ is being maintained practically at the potential of $c3$, transistor T3 is thereby blocked for a predetermined time, despite the application of an unlocking or holding bias to $b3$ from condenser C7. Later, upon the termination of pulse $N-1$, emitter $e2$ of transistor T2 regains ground potential so that when condenser C6 has been discharged, transistor T5 returns to its cut off condition again. When T5 is cut off, the potential difference between emitter $e3$ and collector $c3$ of transistor T3 is restored. Since as previously mentioned, the discharging time of condenser C7 is very much longer than that of condenser C6, base $b3$ receives the holding bias from condenser C7 through R7 both during and well after the discharging of condenser resistor C6. It is seen that as soon as condenser C6 becomes discharged, transistor T3 is automatically unblocked and thus prepared to receive the next pulse N of frequency $f2$.

The provision of transistor T5, then, has the effect of automatically making the first transistor T3 of the last stage inoperative only for the duration of the pulse that actuates the preceding stage $N-1$. This arrangement avoids decoding errors due to input disturbances which could otherwise simultaneously actuate the decoder's last two stages. Further, if the disturbance alone is present at input X–X′, a simultaneous actuation of several stages may occur, but not of the last one. Stage N will be made inoperative by the action of the additional transistor T5 whenever the preceding stage is erroneously actuated.

It will be understood that various changes in the details, materials and arrangements of parts, which have been herein described and illustrated in order to explain the invention, may be made by those skilled in the art within the principle and scope of the invention as defined by the appended claims. For instance, in the illustrated embodiment, only the last two stages are described, but it is apparent that all stages of a decoder, with the exception of the first one, might be improved in the manner disclosed without departing in any way from the scope of the present invention.

I claim:

1. An improved multistage transistor decoder adapted to detect a sequence of signals having different frequencies in which all the frequencies of the signals are applied to all the stages and every stage includes at least: a first transistor which forms, together with a series resonant circuit connected to the emitter terminal and a parallel resonant circuit connected to the collector terminal, a frequency selective amplifier and has its base connected through a resistor to one terminal of a first condenser which has its other terminal grounded; a second transistor forming an electronic switch therein; means comprising a reactive coupling connected between the collector terminal of the first transistor of each stage and the corresponding base of the second transistor for driving the latter; rectifying means coupled between the emitter of said second transistor and the terminal which is not grounded of said first condenser, for generating a D.-C. control signal; means including a diode coupled through the cathode to the emitter of said second transistor and a second condenser connected between the anode of said diode and the ground for generating a D.-C. output signal; a bias source for the decoder; an additional transistor connected between first and second successive stages of said decoder with its base connected to the not-grounded terminal of the first condenser of said first stage, the collector of said additional transistor being connected to a pole of said bias source, and the emitter of the same additional transistor being connected to the emitter of the first transistor in said second stage so that said additional transistor cuts off the first transistor of said second stage in response to said D.-C. control signal generated by said first stage; and a resistor connecting to ground the emitter of said first transistor.

2. An improved decoder as defined in claim 1, in which resistance means couple said second condenser to the base of the first transistor of said second stage, where the discharge time constant of said second condenser is much longer than the time constant of said first condenser so that the first transistor of the second stage is unblocked by said second condenser when the blocking action of said additional transistor ceases.

3. An improved multistage transistor decoder adapted to detect a sequence of signals having different frequencies in which all the frequencies of the signals are applied to all the stages and every stage includes at least: a first transistor which forms in each stage, together with a series resonant circuit connected to the emitter terminal and a parallel resonant circuit connected to the collector terminal, a frequency selective amplifier and has its base connected through a resistor to one terminal of a first condenser which has its other terminal grounded; a second transistor which forms an electronic switch; means comprising an inductive or capacitive coupling connected between the collector terminal of the first transistor of each stage and the corresponding base of the second transistor for driving the latter; rectifying means coupled between the emitter of said second transistor and the terminal not connected to ground of said first condenser for generating a D.-C. control signal; means including a diode coupled through the cathode to the emitter of said second transistor and a second condenser connected between the anode of said diode and ground for generating a D.-C. output signal; a bias source for the decoder; a plurality of additional transistors, one connected between each successive stage of said decoder, the base of each additional transistor being connected to the not-grounded terminal of the first condenser of a separate stage, the collectors of said additional transistors being connected to a pole of said bias source; means for connecting the emitter of each additional transistor to the emitter of the first transistor in the following stage so that each additional transistor cuts off the first transistor of its following stage in response to the D.-C. control signal generated by its preceding stage; and a resistor connecting to ground the emitter of said first transistor.

References Cited by the Examiner

UNITED STATES PATENTS

| | | | |
|---|---|---|---|
| 2,405,664 | 8/1946 | Mumma | 328—49 |
| 2,552,781 | 5/1951 | Hadfield | 328—49 |
| 3,039,081 | 6/1962 | Smith | 340—171 |
| 3,054,865 | 9/1962 | Holloway et al. | |

NEIL C. READ, *Primary Examiner.*

A. GAUSS, *Examiner.*

E. DREYFUS, P. XIARHOS, H. PITTS, *Assistant Examiners.*